US012438198B2

(12) United States Patent
Searl et al.

(10) Patent No.: US 12,438,198 B2
(45) Date of Patent: *Oct. 7, 2025

(54) CLOSED-LOOP LEAD ACID BATTERY RECYCLING PROCESS AND PRODUCT

(71) Applicant: CPS Technology Holdings LLC, New York, NY (US)

(72) Inventors: Jason Searl, Bayside, WI (US); Brian Wycklendt, Fort Myers, FL (US); Craig William Rigby, Milwaukee, WI (US); Jeramy William LeMieux, Mukwonago, WI (US); Corey Lee Graven, Cedarburg, WI (US); Hiroko Kawai, Bayside, WI (US); Edmund Adam Muellerweiss, Grafton, WI (US)

(73) Assignee: CPS Technology Holdings LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/454,412

(22) Filed: Aug. 23, 2023

(65) Prior Publication Data
US 2023/0395872 A1 Dec. 7, 2023

Related U.S. Application Data

(63) Continuation of application No. 17/472,352, filed on Sep. 10, 2021, now Pat. No. 11,742,527.

(60) Provisional application No. 63/077,317, filed on Sep. 11, 2020.

(51) Int. Cl.
*H01M 10/42* (2006.01)
*H01M 10/12* (2006.01)
*H01M 50/414* (2021.01)

(52) U.S. Cl.
CPC ......... *H01M 10/12* (2013.01); *H01M 50/414* (2021.01)

(58) Field of Classification Search
CPC .... H01M 10/12; H01M 50/414; H01M 10/54; Y02E 60/10; Y02P 70/50; Y02W 30/84
See application file for complete search history.

(56) References Cited

FOREIGN PATENT DOCUMENTS

CN 109796041 5/2019

OTHER PUBLICATIONS

International Search Report and the Written Opinion of the International Searching Authority, mailed Nov. 29, 2021, PCT/US2021/049934.
Recycling Batteries—Battery Council International, XP055863435, Retrieved from the Internet: Dec. 14, 2019 (Dec. 14, 2019) URL: https://web.archive.org/web/20191214005227/https://batterycouncil.org/page/BatteryRecycling.

(Continued)

*Primary Examiner* — Cynthia K Walls
(74) *Attorney, Agent, or Firm* — Boardman & Clark LLP

(57) ABSTRACT

A closed-loop system of tracking and managing the recycling and manufacturing a lead acid battery is described herein. The system includes collecting one or more used lead acid batteries, collecting data related to the one or more lead acid batteries, and processing the one or more lead acid batteries. Processing the one or more lead acid batteries includes separating the batteries into lead, polymer, acid, and separator components and isolating the components. The lead and polymer are then recycled, and data is collected related to the recycled lead and recycled polymer. A new lead acid battery is created using the recycled lead and the recycled polymer and provided to a point of sale location.

17 Claims, 5 Drawing Sheets

(56) References Cited

OTHER PUBLICATIONS

Battery Council International—Bci: "Lead Battery Recycling Process", Feb. 16, 2017, XP055863442, Retrieved from the Internet: https://www.youtube.com/watch?v=eO-X8Gw2nXY.

Smelting Lead: "Our Environmental Protection Plan Our Environmental Accomplishments", Jun. 29, 2017, https://web/archive.org/web2017062904102if_http://www.eastpennmanufacturing.com/wp-content/uploads/Recycling-Brochure-.103.pdf.

Smelting Lead: "Designing resilient water systems for extreme weather events ES&E's Annual Guide to Environmental Government Offices, Associations, Academic Institutions and Training Providers Working towards energy-neutral wastewater treatment Managing water systems during the COVID-19 pandemic". Aug. 9, 2020, URL: https://esemag.com/hazmat-remediation/closed-loop-recycle-lead-batteries/.

Anonymous: "Battery Recycling Process | Johnson Controls | Recycling My Battery", May 30, 2016, https://web.archive.org/web/20160530015502/https://www.recyclingmybattery.com/en-us/recycling-process.

Sasikumar P. et al.: "Integration of closed loop distribution supply chain network and 3PRLP selection for the case of battery recycling", International Journal of Production Research, vol. 49, No. 11, Jun. 1, 2011, pp. 3363-3385.

Bied-Charreton, Closed loop recycling of lead/acid batteries, Journal of Power Sources, 42 (1993).

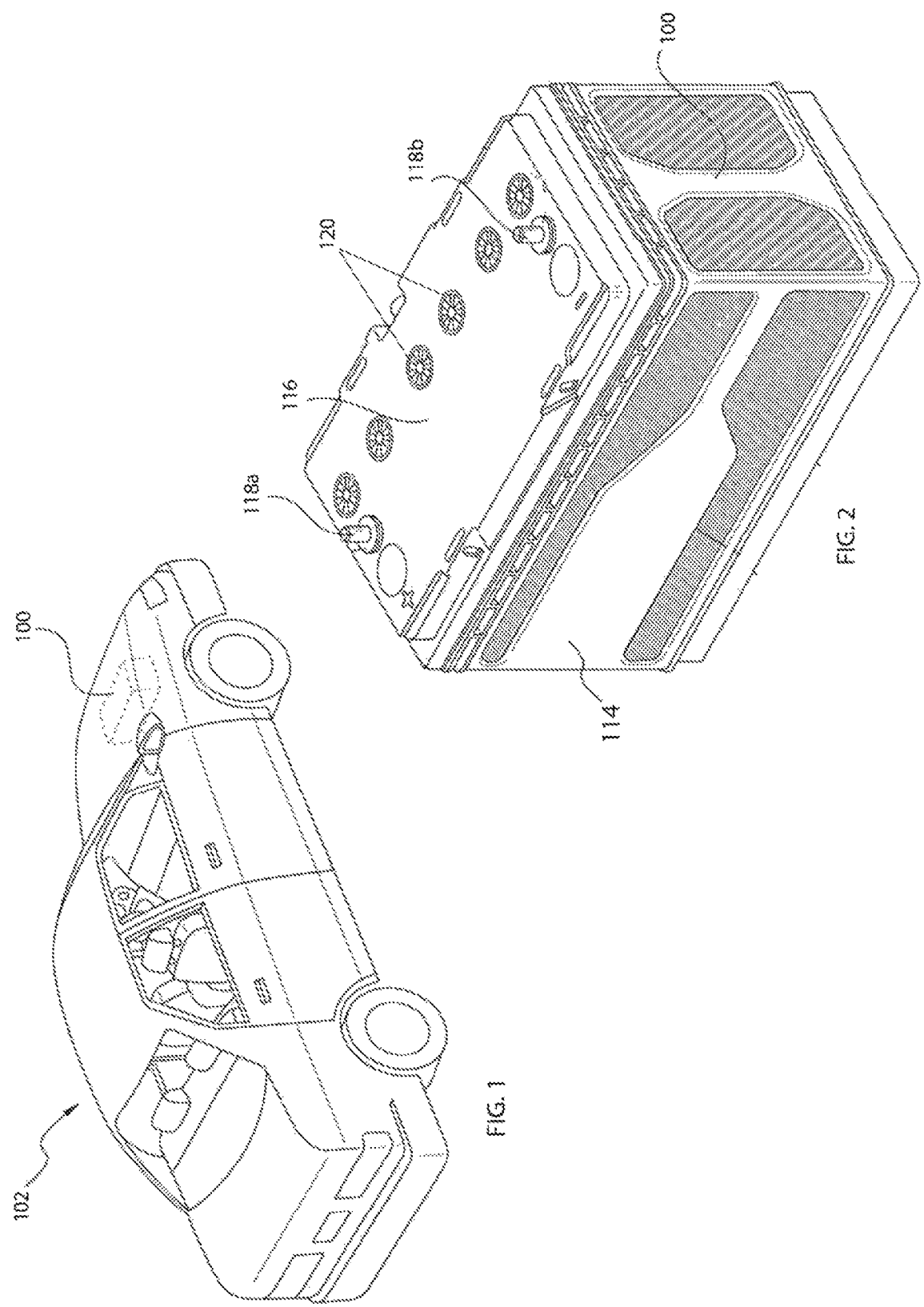

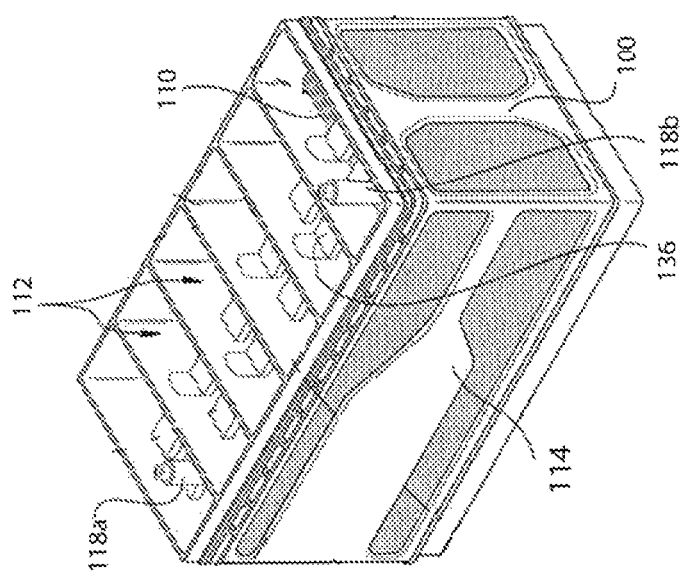

CLOSED-LOOP LEAD ACID BATTERY RECYCLING PROCESS AND PRODUCT

This application claim priority from U.S. application Ser. No. 17/472,352, filed Sep. 10, 2021, entitled "CLOSED-LOOP LEAD ACID BATTERY RECYCLING PROCESS AND PRODUCT", now U.S. Pat. No. 11,742,527; which claims the benefit of U.S. Application No. 63/077,317, filed Sep. 11, 2020, entitled "CLOSED-LOOP LEAD ACID BATTERY RECYCLING PROCESS AND PRODUCT". The preceding applications are incorporated herein by reference.

BACKGROUND

The present disclosure relates to supply chains and closed-loop recycling of a product to capture materials and value. The present disclosure more specifically describes an example of a closed-loop method and system of recycling lead acid batteries, and a battery made from said method and system.

Lead acid batteries are known. Lead acid batteries are made up of plates of lead and separate plates of lead dioxide, which are submerged into an electrolyte or acid solution. The lead, lead dioxide, and electrolyte provide a chemical means of storing electrical energy which can perform useful work when the terminals of a battery are connected to an external circuit. The plates of lead, lead dioxide, and electrolyte, together with a battery separator, are contained within a housing of a polypropylene material. The component parts of the lead acid batteries require a certain degree of precise manufacturing to ensure the absence of impurities in the manufacture, distribution, and use of the batteries. The disparate battery components, including differences in specific weight and gravity, molding and deformation characteristics, toxicity, reconstitution quotients, and the intra-contamination of the battery components historically inhibit large-scale effective restoration of these enclosed batteries.

Lead acid batteries have a life cycle. For various reasons, over time a lead acid battery will short, expire, or otherwise be used up or spent, requiring disposal. As a result, a means for processing a spent lead acid battery; the reconstitution of a new battery resulting from the disposal of a spent battery, is needed. Preferably, such a means is accomplished through sustainable means. In order to achieve this objective, a comprehensive, systematic, and circular process is needed to ensure large-scale collection, processing, recovery, and optimal reuse of the component materials to manufacture new batteries in an efficient, economically viable, and environmentally preferable manner.

SUMMARY

Accordingly, recovery, recycling, and reuse of product in a defined virtuous circle is disclosed. More specifically, an example of a circular or integrated system or method for tracking and managing the closed-loop recovery, recycling, and manufacturing as well as enabling components such as customer/supplier spent battery accounting and compensation, optimized recycling network design, and tolling management of lead acid batteries is disclosed.

An example closed-loop system of tracking and managing the recycling and manufacturing a lead acid battery is described herein. The system includes collecting one or more used lead acid batteries, collecting data related to the one or more lead acid batteries, and processing the one or more lead acid batteries. Processing the one or more lead acid batteries includes separating the batteries into lead, polymer, acid, and separator components and isolating the components. The lead and polymer are then recycled, and data is collected related to the recycled lead and recycled polymer. A new lead acid battery is created using the recycled lead and the recycled polymer and provided to a point of sale location.

A transaction involving the exchange of one or more spent lead acid batteries with one or more new lead acid batteries is also disclosed. The transaction is the first step in a circular process and involves delivering a new lead acid battery and collecting an old lead acid battery at the time of delivery of the new lead acid battery. The transaction comprises a means to provide a value to a new lead acid battery via recycling and tracking of battery raw materials, one or more of which are sourced from a battery customer through this transaction and a series of other transactions which comprise a closed-loop or circular supply chain to optimally manufacture batteries from these raw materials.

A lead acid battery optimized and formed by the raw materials generated by the system or method or transaction is also disclosed. Using this system this lead acid battery can be repeatedly recovered, reclaimed, and reused in an efficient, economically viable, holistically processed, and environmentally preferable manner. A lead acid battery that is created using this example process lead that is ninety-eight percent (98%) by weight reconstituted lead, lead dioxide that is ninety-eight percent (98%) by weight reconstituted lead dioxide, and polypropylene that is ninety-five percent (95%) by weight reconstituted polypropylene. Overall, the lead acid battery is created from at least ninety percent (90%) by weight of recycled or reconstituted materials.

BRIEF DESCRIPTION OF DRAWINGS

Various examples of embodiments of the systems, devices, and methods according to this invention will be described in detail, with reference to the following figures, wherein:

FIG. 1 is a perspective view of a vehicle for use with lead acid battery according to one or more examples of embodiments described herein.

FIG. 2 is a perspective view of lead acid battery according to one or more examples of embodiments described herein.

FIG. 3 is a perspective view of the lead acid battery shown in FIG. 2, with the cover removed.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

Referring to the Figures, a battery 100 is disclosed. In particular, the battery 100 a rechargeable battery, such as, for example, a lead acid battery. Various embodiments of lead acid storage batteries may be either sealed (e.g., maintenance-free) or unsealed (e.g., wet). While specific examples are described and illustrated, the battery 100 may be any secondary battery suitable for the purposes provided.

Figure 4:
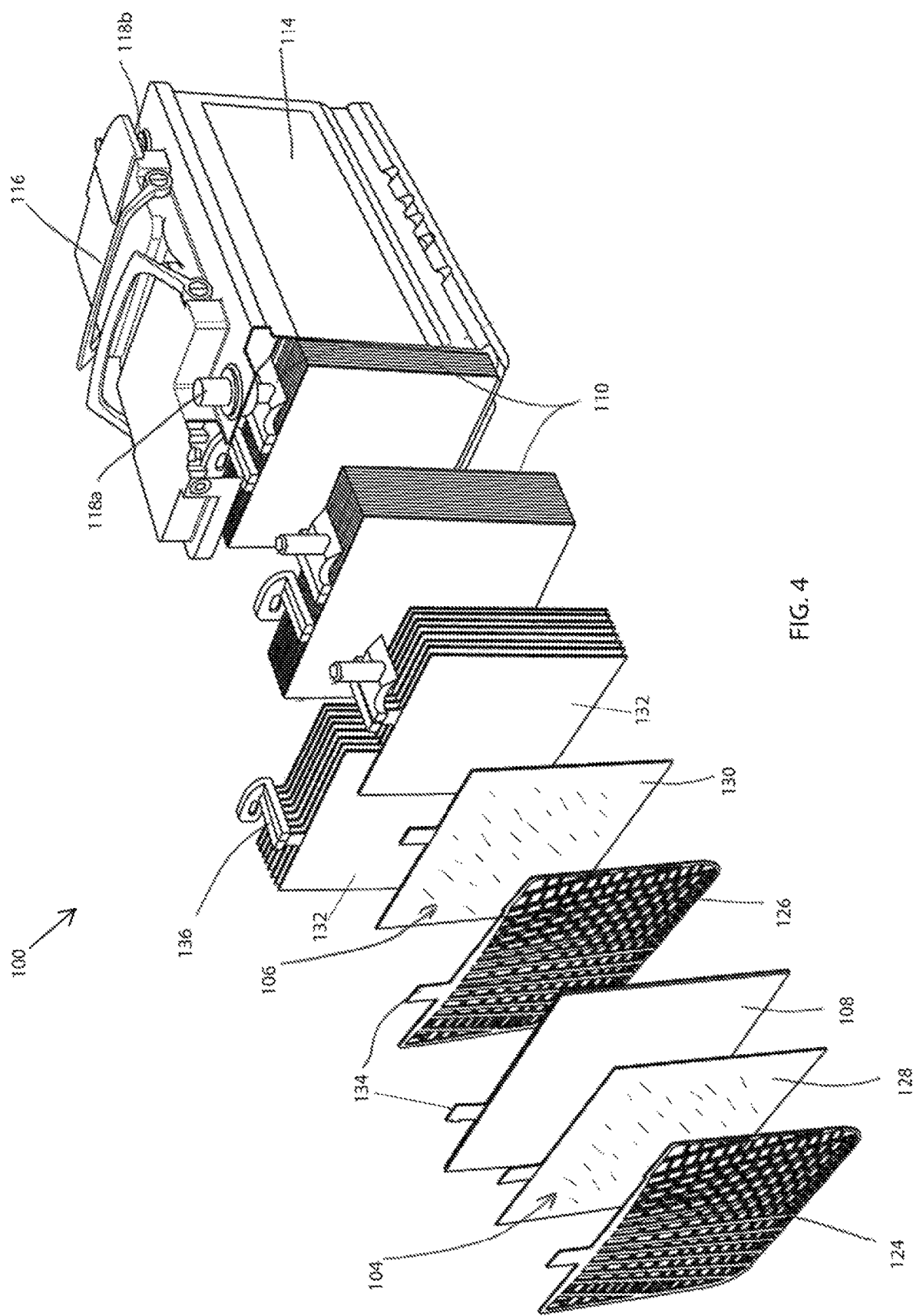
FIG. 4 is an exploded perspective view of a lead acid battery according to one or more examples of embodiments described herein.

One example of a battery 100 is provided and shown in a vehicle 102 in FIG. 1. While a vehicle battery is shown and described, the disclosure and system described herein are not limited thereto. The battery 100 may be any type of lead acid battery, including for example, industrial or back-up batteries, as well as other types of lead acid batteries. Referring to FIGS. 2-4, the battery 100 is a lead acid battery. The lead acid battery 100 is composed of a housing 114 or container which includes a cover 116. The cover 116 may be sealed to the container 114. In various embodiments, the container 114 and/or cover 116 includes battery terminals 118 (e.g., a positive terminal, a negative terminal). As shown in FIG. 2, the battery cover 116 may also include one or more filler hole caps and/or vent assemblies 120. An electrolyte, which is typically sulfuric acid, may be included in the battery 100 within the housing 114.

Positive and negative electrodes or plates 104, 106 are positioned within the housing 114. Referring to FIG. 4, the electrodes 104, 106 include electrically-conductive positive or negative current collectors or substrates or grids 124, 126. A "grid" may include any type of mechanical support for the active material. Positive paste 128 is provided in contact with and/or on the positive grid 124 and negative paste 130 is provided in contact with and/or on the negative grid 126. More specifically, the positive plate 104 includes a positive grid 124 having or supporting a positive active material or paste 128 thereon. The negative plate 106 includes a negative grid 126 having or supporting a negative active material or paste 130 thereon. A separator 108 is positioned between each of the positive and negative electrodes or plates 104, 106. In a retained electrolyte-type battery 100, the separator 108 may be a porous and absorbent glass mat (AGM).

A plurality of positive electrodes or plates 104 and a plurality of negative electrodes or plates 106 (with separators 108) generally make up at least a portion of the electrochemical cell 110, as shown in FIGS. 3 and 4. Referring to FIGS. 3 and 4, a plurality of plate or electrode sets or books or cell elements 110 may be electrically connected (e.g., electrically coupled in series or other configuration) according to the capacity of the lead-acid storage battery 100. Each current collector 124, 126 has a lug 134 (see FIG. 4). In FIGS. 3 and 4, one or more cast-on straps or intercell connectors 136 are provided, which electrically couple the lugs 134 of like polarity in an electrode or plate set or cell element 110 and to connect other respective sets or cell elements 110 in the battery 100. The connection of the cell elements 110 may be a single element, parallel connection (e.g., capacity doubled, voltage the same) or series connection (e.g., voltages are additive, i.e., 4V, 6V, etc., with the same capacity). As shown in FIGS. 2-4, one or more positive terminal posts 118a and one or more negative terminal posts 118b may also be provided. Such terminal posts 118 typically include portions which may extend through a wall of the cover 116 and/or container 114, depending upon the design of the battery 100. It will be recognized that a variety of terminal arrangements are possible, including top, side, front or corner configurations, which are known in the art.

A plurality of positive electrodes or plates 104 and negative electrodes or plates 106 may be provided in stacks or sets or cell elements 110 for producing a battery having a predetermined voltage, such as, for example, a 12-volt battery in a vehicle 102. The number of cell elements 110 or groups or sets may be varied. It will also be obvious to those skilled in the art after reading this specification that the size and number of electrodes 104 and/or 106 in any particular group (including the size and number of the individual current collectors), and the number of groups used to construct the battery 100 may vary depending upon the desired end use.

In one or more examples of embodiments, the positive grid 124 and the negative grid 126 may be primarily composed of lead or lead alloy. Similarly, the intercell connectors 136 and/or terminals 118 may be composed of lead or lead alloy. In one or more preferred examples of embodiments, the lead or lead alloy may be a recycled lead or lead alloy.

The active material or paste (positive and negative) may also be formed of compositions including lead or lead oxide. In one or more preferred examples, the lead may be a recycled lead.

The housing 114 and cover 116 may be primarily composed of a polymer material. In one or more preferred examples of embodiments, the polymer material may be a recycled polymer material.

Figure 5:
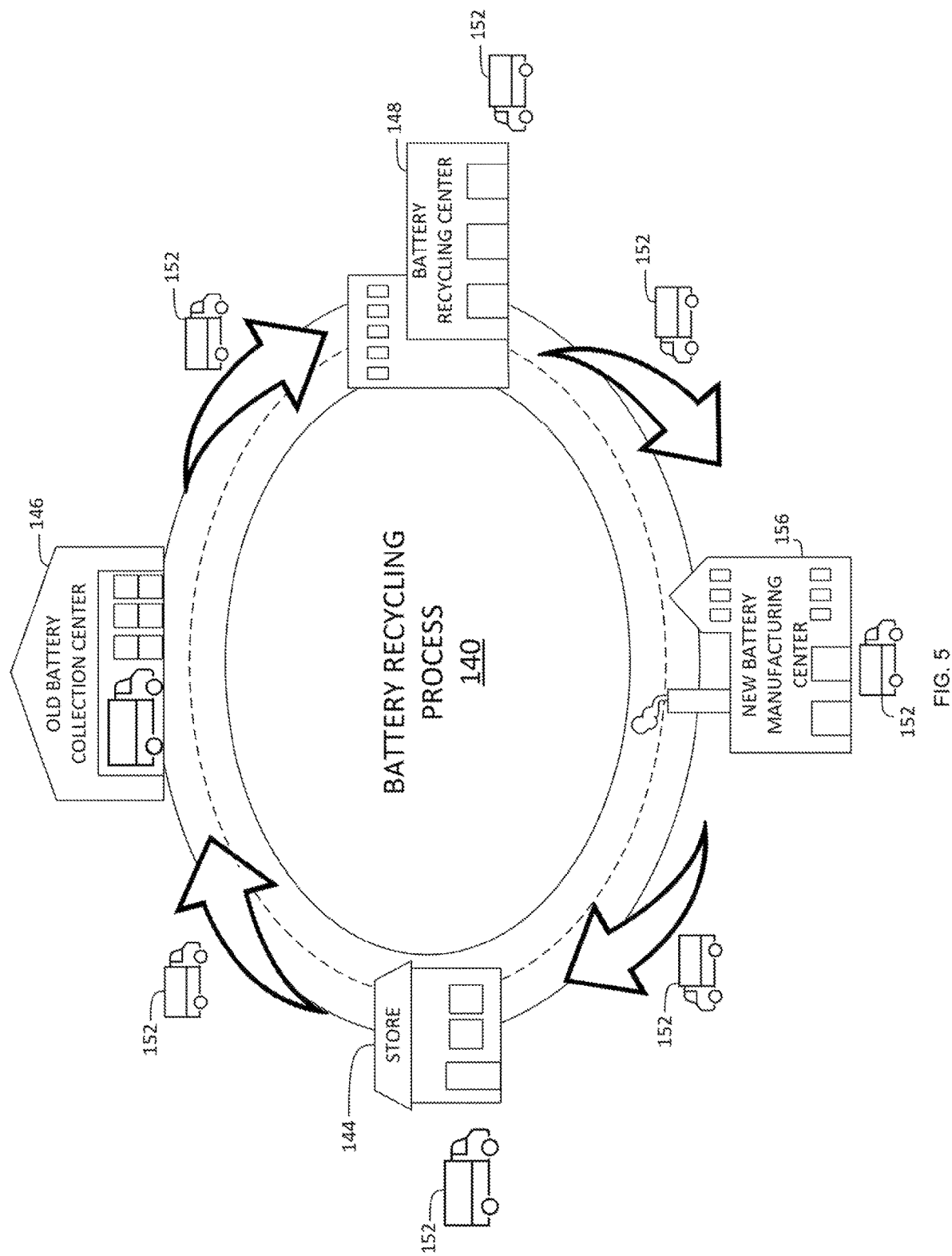
FIG. 5 shows an example cycle flow chart of a system or method for tracking and managing the recycling and manufacturing of a lead acid battery that is a precursor of the invention as described herein.
Figure 6:
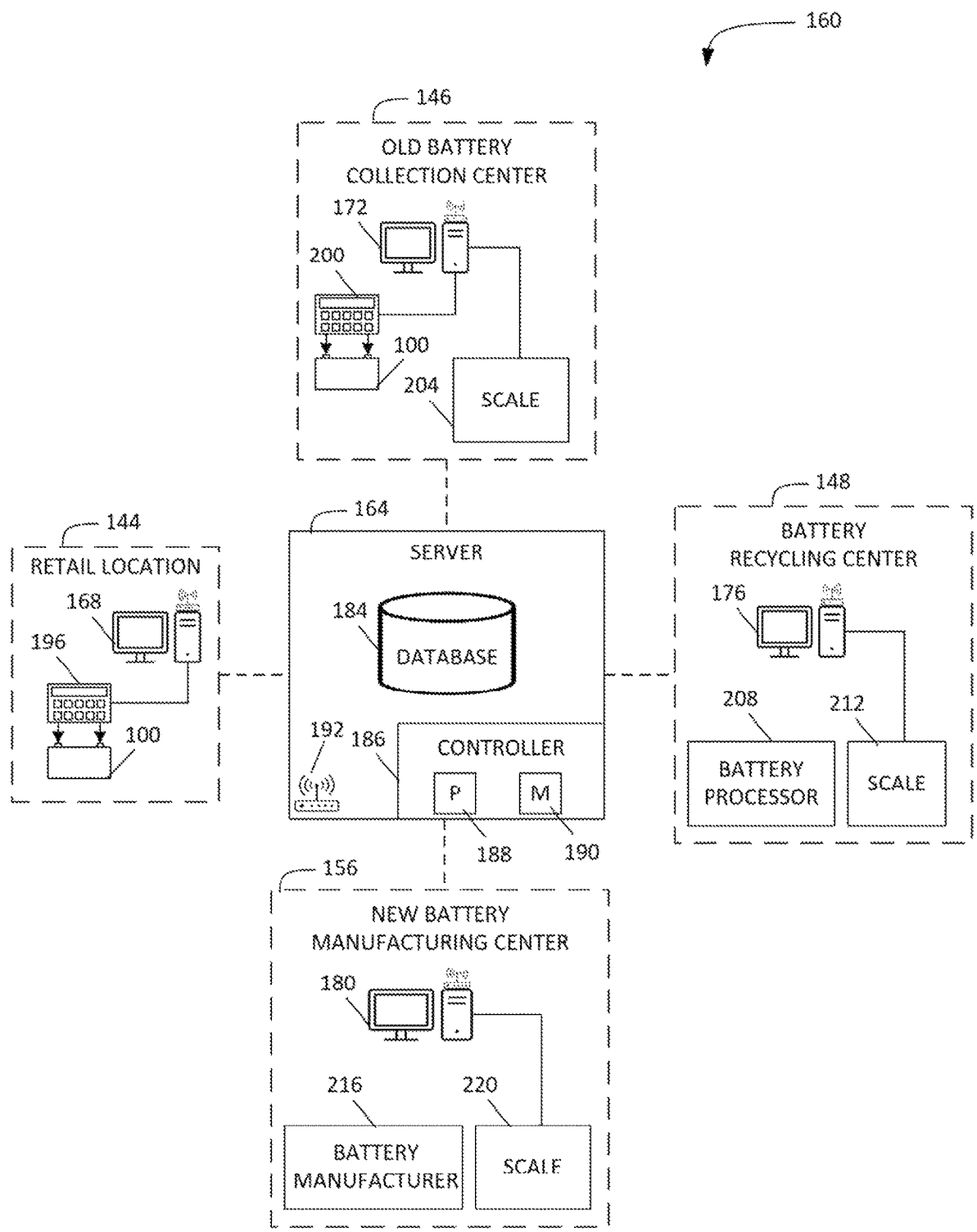
FIG. 6 shows an example system that may be used to implement the example recycling process described herein.

FIGS. 5 and 6 depict example processes for implementing a circular or closed-loop systems 140 or methods for tracking and managing the recycling and manufacturing of lead acid batteries 100 of the type described hereinabove is disclosed. The example closed-loop system or process 140 is a complete life-cycle method of tracking and managing the recovery, recycling, and reuse of spent lead-acid batteries 100 to maximize the supply of sustainable raw materials for the manufacturing of lead acid batteries. The example system 140 is built upon the precursor life cycle of lead acid reclamation which historically involved linear methodologies. As a result, the quantification and qualification of individual components could not be effectively tracked to a degree of certainty, thereby diminishing the effective qualification and quantification of certain components.

The new closed-loop system and method 140 described herein comprises a means to provide a value to a new lead acid battery 100 via recycling and tracking of raw materials used to manufacture the battery 100, one or more of which are sourced from a battery customer. The example system 140 is generally circular (e.g., cyclical) and involves delivering a new lead acid battery and collecting an old lead acid battery at the time of delivery of the new lead acid battery 100. Thus, the starting point of the process may be the collection of the old battery 100 or may be the delivery of a new battery 100 with collection of the old battery 100.

In this system 140, a transaction involving the exchange of one or more spent lead acid batteries 100 with one or more new lead acid batteries 100 occurs. More specifically, the method or transaction involves collecting one or more lead acid batteries 100 at a point of sale 144 (e.g., a retail store, such as an auto parts store or any other retail store that sells lead acid batteries) of a lead acid battery 100. For example, the method may include testing or determining, at the point of sale 144, that a lead acid battery 100 is spent and needs to be replaced. An incentive, such as a monetary incentive, may be provided to the point of sale 144 (e.g., the retail store, retail outlet, retail location, retailer) and/or the consumer to collect a spent lead acid battery 100, or simply an old lead acid battery 100, for return and recycling. For example, a "core fee" may be provided to a retailer 144 or battery outlet to encourage the entity to collect spent or old lead acid batteries 100 from customers and deliver those batteries 100 to the system 140 for recycling. In some examples, the batteries 100 may be retrieved from the retail store 144 by, for example, the recycling plant 148 or manufacturer. For example, the used batteries 100 may be retrieved at the time new batteries are delivered, and the used batteries are transported to a recycling plant 148. Likewise, a price adjustment may be provided to the customer to encourage the customer to return a spent or old battery 100 for recycling. While only one point of sale or retail location 144 is depicted in the figures for simplicity, one of skill in the art would understand that this point of sale location 144 may be representative of many physical locations.

The retail outlet 144, workshop, or wholesaler may collect a plurality of spent or old batteries for delivery to a collection system or center 146. In this manner, the spent or old batteries 100 are entered into to the collection system 146, which may be a sub-process or sub-method within the closed-loop system 140 described herein. In the collection center 146, the lead acid battery may be weighed, logged into the collection system, and a recycling center or plant 148 is identified (e.g., a recycling plant 148 is selected based on factors including battery type, plant availability or capacity, proximity, etc.). Accordingly, raw data of batteries on a weight basis may be tracked. In other words, quantifiable (e.g., amount or number of batteries or weight of batteries (individually or as part of a group)) and qualitative data (e.g., vehicle batteries, industrial batteries, and their component parts) may be collected. The customer's and/or outlet's return of a battery 100 may be tracked on a specific basis, for example, to identify the source. This specific tracking may provide information related to which stores and/or regions the incentives for battery collection are successful, which may lead a change in incentives in less successful areas. In some additional examples of embodiments, proof or data such as a photo or image may also be collected. A plurality of spent or old lead acid batteries 100 may be collected, weighed in mass or aggregate, data collected and logged into the collection system. For example, a spent or old battery 100 which is collected may be packed and weighed on a shipping container with other spent or old batteries 100. In some examples, a third party, such as a battery manufacturer or recycler or a logistics company, obtains custody of the spent or old lead acid battery/batteries 100, aggregates data regarding the spent or old lead acid battery/batteries 100, such as the source of the battery 100 and weight of the battery 100, with other spent or old lead acid batteries 100 and identifies locations for recycling of the old or spent lead acid batteries. In this manner, the collection center 146 allows tracking of the amount (in tons) of material purchased and amount (in tons) of material donated or returned back for recycling.

The identified spent or old lead acid battery 100 or batteries is/are dispatched or transported to the recycle center 148. The delivery of new lead acid batteries 100 may occur at the time of collection of the spent/old batteries 100 that have been routed to the identified recycling center 148. In the circular or closed-loop system 140 and method described herein, the lead acid battery 100 is dispatched to an integrated network of recycling centers 148 and transportation partners 152, wherein the location for recycling and recovery is identified and the lead acid battery 100 is transported to the identified location. The integrated network further manages where the raw materials (e.g., the recycled raw materials, new raw materials) go within the system 140 throughout the process.

At the recycling center 148, the lead acid batteries 100 are processed so that the one or more lead acid batteries 100 that have been collected are separated into (e.g., processed, broken down into) different components or component categories including metals, such as lead, plastics and/or polymers, acid, separator components, and other remaining components. After the materials are separated, the components are isolated. That is, the battery 100 is broken down by known means into component parts, comprising, as detailed above: lead, polymer, acid, and separator material, and the battery components are then isolated and separated. In some examples of embodiments, the broken down battery mixture may include other components, such as but not limited to electronics and/or other types of batteries 100 and battery components, such as non-lead acid batteries 100. For example, the mixture may include components from a lithium-ion battery. In this regard, the separation step may also include isolation and separation of these additional components or elements.

Once the components of the lead acid battery 100 are separated, the amount of each battery component that is present can be measured. In one or more examples of embodiments, the spent lead acid battery component parts may be individually weighed following the breakdown of the battery 100, per battery or in mass. Data regarding these component parts may be collected and tracked through the system 140. For example, the data may be collected and tracked in the same groups as the initial weight data that was collected and tracked such that the weight of the components can be aggregated and compared to the initially collected weight of the used batteries 100.

The separated lead and separated polymer are then recycled according to known means. In one or more examples of embodiments, the separated lead is pooled with other separated lead from other lead acid batteries. The separated lead may optionally be pooled with lead of similar type or quality. The separated polymer is pooled with other polymer or separated polymer from other batteries, and may optionally be pooled with polymer of similar type or quality. Data regarding the origin of such raw materials may continue to be tracked throughout the recycling process. In this manner, the system described herein may allow a particular type of raw material to be assigned to a product for a particular customer. In examples where lead from multiple battery groups is pooled prior to processing or recycling, this combination of different groups is tracked such that the total weight of the lead that is recycled can still be aggregated with the weight of the other components of the pooled groups and compared with the original weight of the pooled groups.

The separated acid or electrolyte may likewise be quantified. The acid may be converted into a reusable byproduct. As one example, the acid may be neutralized and delivered into wastewater treatment for subsequent/further use and/or sale. Thus, the electrolytes/acid may not be recycled withing the example system 140 of FIG. 5 for use in new batteries 100. In some examples, the electrolytes may be cleaned using a detergent, according to known methods, such that the electrolytes are suitable for reuse.

Other battery materials (e.g., the separators, controllers, etc.) may be recycled in similar manner or converted to other byproducts or otherwise disposed of based on the material.

The recycled lead and polymers are then transported to a manufacturing center 156. Using the recycled lead and recycled polymer from the closed-loop system 140, a new lead acid battery is constructed at the manufacturing center 156. Preferably, this incurs only incidental material loss within the closed-loop system 140. That is, one or more new lead acid batteries 100 are created from the recycled material of old lead acid batteries 100. In one or more examples of embodiments, at least 90% of the lead used in construction of the new batteries 100 may come from old batteries 100 using this closed-loop process 140. In other examples of embodiments, lead in an amount of up to ninety-eight percent (98%) by weight of reconstituted lead, or alternatively up to ninety-eight percent (98%) by volume reconstituted lead, may be used for the construction of the lead acid battery. In other examples of embodiments, lead dioxide in an amount of up to ninety-eight percent (98%) by weight of reconstituted lead dioxide, or alternatively up to ninety-eight percent (98%) by volume reconstituted lead dioxide, may be used for the construction of the lead acid battery. In other examples of embodiments, polypropylene in an amount of up to ninety-five percent (95%) by weight of reconstituted polypropylene, or alternatively up to ninety-five percent (95%) by volume of reconstituted polypropylene may be used for construction of the lead acid battery. In some examples, up to ninety percent (90%) of each battery by weight is recycled and used to manufacture a new battery.

In addition, based on the data collected in the collection process and center 146 and the tracking of raw materials, this new lead acid battery 100 may be identified as being constructed primarily of recycled material(s). Consequently, a value (or macro value) may be assigned to the new lead acid batteries 100 based on the data obtained and tracked related to the old or spent lead acid batteries which have been recycled in the system 140. This value may be tied to where the raw material came from and/or based on the process of collection and recycling as described herein. Additional values or calculations may be included, such as, but not limited to, energy consumption, greenhouse gas footprint, energy footprint. Generally, value as described herein may be assigned using the mass balance approach. Alternatively, individual measurements (i.e., a site-by-site approach) could be used without departing from the overall scope of the present invention.

This new lead acid battery 100 is delivered to the point of sale 144 (e.g., a retail outlet). The retail outlet 144 sells the new lead-acid battery to a customer and repeats the cycle by collecting the customer's spent or old lead acid battery for recycling according to the process described above. This process 140 of delivery and collection generates a circular supply of batteries and raw materials for said supply of batteries 100 between the customer and the battery manufacturer. As discussed above, the depicted retail outlet 144 may be representative of multiple different physical locations, any one of which may receive the new batteries manufactured using old batteries returned to any other of the locations.

Implementation of the various processes described herein in a systematic and circular manner maximizes the supply of sustainable raw materials for new lead-acid batteries. As described, lead acid batteries are made up of plates of lead and separate plates of lead dioxide, which are submerged into an electrolyte or acid solution. The plates of lead, lead dioxide and electrolyte, together with a battery separator, are contained within a housing of a polypropylene material. These disparate battery components, including plates of lead, lead dioxide, electrolyte, separator, and polymer, are holistically processed in the disclosed closed-loop system.

Advantageously, the method described herein also assigns a value to a lead acid battery product based on environmental factors, driving 90%-100% recycling and reuse of the lead acid battery. The system further provides a means to assign a customer a monetary value for sustainable practices.

Accordingly, a lead acid battery 100 is disclosed comprising a housing 114 comprised primarily of polymer. A plurality of positive electrodes and a plurality of negative electrodes are contained within the housing. The positive electrodes and negative electrodes are comprised primarily of lead raw material. Intercell connectors electrically couple the plurality of positive electrodes and plurality of negative electrodes. The intercell connectors also electrically couple to a positive terminal and a negative terminal. The intercell connectors, the positive terminal, and the negative terminal are primarily composed of lead raw material. Spent product is a primary source of raw materials of polymer and lead used in construction of the lead acid battery. In some additional examples of embodiments, the lead acid battery is assigned a value based on a mass balance measurement which identifies and quantifies the source of raw materials.

FIG. 6 shows an example system 160 that may be used to implement the example recycling process 140 described herein. The example system 160 includes at least a server 164 and one or more terminals 168-180 in communication with the server 164. The server 164 includes a database 184, and a controller 186. The controller 186 may include a processor 188 and a memory 190. The processor 188 can include a component or group of components that are configured to execute, implement, and/or perform any of the processes or functions described herein for the battery recycling process or system or a form of instructions to carry out such processes or cause such processes to be performed. Examples of suitable processors include a microprocessor, a microcontroller, and other circuitry that can execute software. Further examples of suitable processors include, but are not limited to, a core processor, a central processing unit (CPU), a graphical processing unit (GPU), an array processor, a vector processor, a digital signal processor (DSP), a field-programmable gate array (FPGA), a programmable logic array (PLA), an application specific integrated circuit (ASIC), math co-processors, and programmable logic circuitry. The processor 188 can include a hardware circuit (e.g., an integrated circuit) configured to carry out instructions contained in program code. In arrangements in which there are a plurality of processors, such processors can work independently from each other or one or more processors can work in combination with each other.

The memory 190 can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, disks, drives, or any other suitable storage medium, or any combination thereof. The memory 190 can be a component of the controller 186 or the processor 188, can be operatively connected to the controller 186 and/or processor 188 for use thereby, or a combination of both. The controller 186 may also include a communication means 192 (e.g., wireless internet, wired internet, intranet, or any other suitable means for communicating with one or more terminals of the example system). Each terminal 168-180 also includes communication means (e.g., an integrated communication means) for communicating with the server 164. In some arrangements, the memory 190 includes instructions to be executed by the processor 188. In some implementations, the server 164 and terminals 168-180 may be able to communicate using a wireless local area network (WLAN) radio and/or a cellular radio. The communication means includes known hardware, firmware, and software to enable the server 164 to communicate with the terminals 168-180. In addition, the terminals 168-180 may be operative to communicate with one another through any suitable means of wired or wireless communications, either directly or indirectly.

It should be understood by one skilled in the art that the controller 186 may include many additional conventional elements typically found in an electronic device. Further discussion regarding these components is not provided herein since the components are conventional and their operation are conventional. Additionally, though a single memory 190 and processor 188 are depicted, any arrangement of memories or processors may be implemented.

The example database 184 may be communicatively coupled to the controller 186, and thus coupled to the processor 188 and memory 190. The database may include any data collected during the recycling process and/or implementation of the recycling process or system. In some implementations, the memory includes instructions for the processor to use and/or analyze the data stored in the database.

Each of the example terminals 168-180 may be an electronic device, such as any consumer electronic devices, including but not limited to a desktop computer, a laptop computer, a cellular device, a handheld device, a tablet, a smart phone, etc. The terminals 168-180 include a user interface, which includes a display and an input device. In some examples, the input device may be integrated with the display, such as a device with a touchscreen. In other examples, the input device includes known peripheral devices, including a keyboard and mouse. As discussed above, each of the terminals 168-180 includes means for communicating with the server using known hardware, software, and/or firmware via wired or wireless communications.

In the illustrated example, a first terminal 168 may be located at the point of sale 144 or retail location. The first terminal 168 may be communicatively connected to a battery tester 196, which may be used to determine that a battery 100 is spent or used and is ready to be recycled. The example battery tester 196 may include one or more leads to connect to the terminals, a user interface, and/or a user input device. Information from the battery tester 196 (e.g., a spent or used status of the battery, a type of battery) may be communicated to the first terminal 168. Additionally, consumer information (e.g., a name, rewards program information, incentive program information, location, etc.) may be collected and entered into the terminal 168. The data related to the battery and/or the consumer information may be communicated to the server 164 via, for example, a wireless or wired internet or intranet connection, and stored in the database 184.

An old battery collection center 146 may include a second terminal 172. As described above, the collection center 146 may be used to collect and sort batteries 100 from the point of sale location(s) 144. In some examples, the batteries 100 may be tested using a second battery tester 200 upon arrival at the collection center 146. The battery data from the battery tester 200 may be communicated with the second terminal 172 at the collection center 146. At the collection center 146, the old batteries may be weighed using a first scale 204, either individually or as a group, and the weight data collected is also communicated with the second terminal 172. The example scale 204 is operatively connected to the second terminal 172 to communicate data measured by the scale 204 to the second terminal 172. The example scale 204 may include a display to indicate the weight, and/or may automatically communicate the weight to the server, via the terminal, for storage in the database. The second terminal 172 communicates the battery and weight data with the server 164 to store the data in the database 184. If the batteries 100 are weighed as a group, the group may be assigned an identifying code or serial number so that data related to each specific group may be tracked. Similarly, if the battery 100 is weighed individually, the data related to the battery 100 may be aggregated into a dataset containing information for other batteries, and the dataset may be assigned a code or serial number for tracking. In some such examples, each individual battery is assigned a serial number or is tracked using a serial number assigned to the battery at the time of manufacture, and the serial numbers for the batteries in each group or associated with each dataset are tracked throughout the closed loop recycling process or system 140 described herein.

At the battery recycling center 148, a battery processor 208 processes and separates the batteries 100 in each group of batteries into the different components. The battery processor 208 may include one or more electronic devices and/or machines to process the batteries. Thus, the battery processor 208 may include one or more controllers, each of which may include a processor and/or memory, and which may be communicatively coupled to a third terminal 176 at the recycling center 148. The components of each group are weighted using a second scale 212 at the recycling center 148. In some examples, the components, specifically the lead and the polymers, are treated and purified prior to being weighed. The data related to the weight of each of the components of the batteries is communicated with the third terminal 176 at the recycling center 148. The terminal 176 then communicates the weight data to the database 184. The weight of the separate components of each group of batteries may be compared to the weight of the group of batteries that was measured at the collection center 146. The comparison of the weight of the intact batteries and the separated components may be used to determine if there are losses during the recycling process. A percentage of the battery used may be determined by, for example, the processor or the server using the comparison.

At the new battery manufacturing center 156, a battery manufacturer 216 uses the raw materials (e.g., the lead and polymer) created at the recycling center 148 to create new batteries. The battery manufacturer 216 may include one or more electronic devices and/or machines to manufacture the batteries. Thus, the battery manufacturer 216 may include one or more controllers, each of which may include a processor and/or memory, and which may be communicatively coupled to a fourth terminal 180 at the manufacturing center 156. In some examples, the newly created batteries may be weighed using a third scale 220, and the weight is communicated with the fourth terminal 180 at the battery manufacturing center 156. Additionally, in some examples, data indicating that the battery was manufactured using recycled materials and/or data indicating the origin of the materials is associated with the battery using, for example, a new serial number assigned to the battery. The data is communicated from the fourth terminal 180 to the server 164 and is stored in the database 184 for later usage. For example, the new serial number assigned to the new battery may be used for tracking the battery to a point of sale 144 location and/or through the recycling process after the battery is spent.

In the example described herein, the retail location 144, old battery collection center 146, battery recycling center 148, new battery manufacturing center 156, and server 164 may be located at separate locations. Alternatively, one or more of the retail location 144, old battery collection center 146, battery recycling center 148, new battery manufacturing center 156, and server 164 may be located in the same location. For example, the old battery collection center 146 may be located at a same physical location as the recycling center 148. In such examples, the battery collection center 146 and the recycling center 148 may share a terminal and/or a scale. Additionally, the manufacturing center 156 may also be in the same physical locations as the recycling center 148 and/or the collection center 146. In some examples, the server 164 may located at the same physical location as any one of the collection center 146, the recycling center 148, or the manufacturing center 156. In some examples, any of the collection center 146, recycling center 148, or manufacturing center 156 may also operate as a point of sale location 144.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

What is claimed is:

1. A closed-loop process of managing a battery recycling and a battery manufacturing, the process comprising:
   collecting, via a first terminal at a first location, first data related to a weight of each of one or more batteries;
   processing, at a second location, the one or more batteries so as to recycle the batteries and separating components of the batteries into a recycled metal and a recycled polymer;
   determining, via a second terminal at the second location, second data related to a separate weight of at least one of the recycled metal and the recycled polymer;
   comparing the first data to the second data to calculate a weight loss of at least one of the components during the recycling using a server electrically coupled with the first terminal and the second terminal;
   creating a new battery using the recycled metal and the recycled polymer; and
   accounting for a loss of the recycled metal.

2. The process of claim 1, further comprising calculating the separate weight of at least one of the recycled metal and the recycled polymer, with the weight of the recycled metal and the recycled polymer being the second data.

3. The process of claim 1, further comprising determining a percentage of the one or more batteries recycled by the comparing of the first data and the second data.

4. The process of claim 1, further comprising providing the new battery to a point of sale location.

5. The process of claim 4, wherein the first terminal being at an initial point of sale location from which the battery is collected, with the point of sale location being different from the initial point of sale location.

6. The process of claim 1, wherein the second location is different from the first location.

7. A method of managing recycling and manufacturing a battery, the method comprising:
   collecting, via a first terminal at a first location, first data related to the battery;
   collecting, via a second terminal at a second location, second data related to the battery, wherein the second data includes a weight of the battery;
   recycling the battery at a third location and providing for battery components, the battery components including a metal;

determining, via a third terminal at the third location, third data, wherein the third data includes an individual weight of each of the battery components;

comparing the second data to the third data to calculate a weight loss of at least one of the battery components during the recycling using a server electrically coupled with the first terminal and the second terminal;

creating a new battery using the metal;

collecting, via a fourth terminal at a fourth location, a weight of the new battery; and accounting for a loss of the metal.

8. The method of claim 7, wherein the first data includes a status of the battery.

9. The method of claim 7, further comprising accumulating and transferring, via computer network, at least one of the first data and the second data to at least one of a server and a database.

10. The method of claim 9, further comprising accumulating and transferring, via computer network, the third data to at least one of the server and the database.

11. The method of claim 9, further comprising accumulating and transferring, via computer network, the weight of the new battery to at least one of the server and the database and assigning the new battery a serial number.

12. The method of claim 7, wherein the collecting of the first data is in proximity to the second location and the collecting of the second data is in proximity to the third location.

13. The method of claim 7, wherein at least two of the first location, the second location, the third location, and the fourth location are located at a same location.

14. A complete life-cycle method of managing recovery, and recycling of batteries to for manufacturing of new batteries comprising:

providing a battery to a collection center, wherein the battery is weighed for a first data collected on the battery;

dispatching the battery to one of an integrated network of recycling locations, where the battery being broken down into component parts, with the component parts comprising a metal;

determining a second data at the recycling location as to the metal, with the second data being a weight of the metal;

accumulating and transferring, via computer network, the second data to at least one of a server and database;

comparing the first data to the second data to estimate a weight loss for metal;

creating a new battery with the metal at a manufacturing center;

accounting for a loss of the metal; and delivering the new battery to a retail outlet.

15. The method of claim 14, wherein the component parts are weighed separately following breakdown.

16. The method of claim 14, wherein the collecting of the first data is about the collection center.

17. The method of claim 14, wherein at least two of the collection center, the recycling location, and the manufacturing center are located at a same location.

* * * * *